US011930812B2

United States Patent
Harman et al.

(10) Patent No.: US 11,930,812 B2
(45) Date of Patent: Mar. 19, 2024

(54) COATING MATERIALS FOR SEEDS AND FOR PARTICULATE MATERIALS, INCLUDING FERTILIZERS

(71) Applicant: ADVANCED BIOLOGICAL MARKETING, INC., Van Wert, OH (US)

(72) Inventors: Gary Harman, Geneva, NY (US); Molly Cadle-Davidson, Geneva, NY (US); Walid Nosir, Geneva, NY (US)

(73) Assignee: Agrauxine Corp., Milawaukee, WI (US)

( * ) Notice: Subject to any disclaimer, the term of this patent is extended or adjusted under 35 U.S.C. 154(b) by 3 days.

(21) Appl. No.: 16/497,975

(22) PCT Filed: Mar. 30, 2018

(86) PCT No.: PCT/US2018/025591
§ 371 (c)(1),
(2) Date: Sep. 26, 2019

(87) PCT Pub. No.: WO2018/183977
PCT Pub. Date: Oct. 4, 2018

(65) Prior Publication Data
US 2021/0101847 A1    Apr. 8, 2021

Related U.S. Application Data

(60) Provisional application No. 62/479,080, filed on Mar. 30, 2017, provisional application No. 62/479,074, (Continued)

(51) Int. Cl.
*A01N 31/02*    (2006.01)
*A01C 1/06*    (2006.01)
(Continued)

(52) U.S. Cl.
CPC ............ *A01N 31/02* (2013.01); *A01C 1/06* (2013.01); *A01N 43/08* (2013.01); *A01N 43/16* (2013.01);
(Continued)

(58) Field of Classification Search
CPC .... C05G 3/60; C05G 5/12; C05G 5/30; C05F 11/08; C05F 17/20; A01C 1/06;
(Continued)

(56) References Cited

U.S. PATENT DOCUMENTS 6,060,051 A    5/2000  Heins et al.
6,210,665 B1    4/2001  Heins et al.
(Continued)

FOREIGN PATENT DOCUMENTS

EP    0997074 A1    5/2000
WO    WO9850422 A1    11/1998
(Continued)

OTHER PUBLICATIONS

Kottb, Metwally, et al. "Trichoderma volatiles effecting *Arabidopsis*: from inhibition to protection against phytopathogenic fungi." Frontiers in microbiology 6 (2015): 995. (Year: 2015).*
(Continued)

*Primary Examiner* — Jennifer A Smith
(74) *Attorney, Agent, or Firm* — Reising Ethington P.C.

(57) ABSTRACT

This disclosure includes the following components, all intended for the purpose of enhancing plant growth and performance: the capabilities of 1-octen-3-ol, which is a metabolite of *Trichoderma* strains and formulations thereof, a method for formulating this component or other highly effective compounds into stable formulations, and other materials which are expected to be effective with such components and methods. *T. afroharzianum* (formerly *T. harzianum*) produces 1-octen-3-ol (mushroom alcohol) and
(Continued)

that at very low concentrations in aerial solution enhances plant growth and productivity, a result that could be duplicated by seed treatments at low concentrations.

9 Claims, 4 Drawing Sheets

Related U.S. Application Data filed on Mar. 30, 2017, provisional application No. 62/479,084, filed on Mar. 30, 2017.

(51) Int. Cl.
| | |
|---|---|
| A01N 43/08 | (2006.01) |
| A01N 43/16 | (2006.01) |
| A01N 43/36 | (2006.01) |
| A01N 43/72 | (2006.01) |
| A01N 43/90 | (2006.01) |
| A01N 63/12 | (2020.01) |
| A01N 63/20 | (2020.01) |
| A01N 63/38 | (2020.01) |
| C05F 17/20 | (2020.01) |
| C05G 3/60 | (2020.01) |
| C05G 5/12 | (2020.01) |
| C05G 5/30 | (2020.01) |

(52) U.S. Cl.
CPC ............. *A01N 43/36* (2013.01); *A01N 43/72* (2013.01); *A01N 43/90* (2013.01); *A01N 63/12* (2020.01); *A01N 63/20* (2020.01); *A01N 63/38* (2020.01); *C05F 17/20* (2020.01); *C05G 3/60* (2020.02); *C05G 5/12* (2020.02); *C05G 5/30* (2020.02)

(58) Field of Classification Search
CPC ........ A01N 43/08; A01N 43/16; A01N 43/36; A01N 43/72; A01N 43/90; A01N 63/20; A01N 63/38; A01N 31/02; A01N 63/12; A01N 63/06; Y02W 30/40
See application file for complete search history.

(56) References Cited

U.S. PATENT DOCUMENTS

| 6,242,420 | B1 | 6/2001 | Hanson et al. | |
|---|---|---|---|---|
| 2003/0186852 | A1 | 10/2003 | Heins et al. | |
| 2005/0266036 | A1* | 12/2005 | Awada | A01N 63/20 504/117 |
| 2008/0175930 | A1 | 7/2008 | Baseeth | |
| 2011/0027232 | A1 | 2/2011 | Harman et al. | |
| 2014/0323297 | A1* | 10/2014 | Harman | C05F 11/08 504/101 |
| 2015/0057157 | A1 | 2/2015 | Baseeth et al. | |
| 2015/0157027 | A1* | 6/2015 | Harman | A01N 65/00 424/93.5 |
| 2016/0015029 | A1 | 1/2016 | Baseeth | |
| 2016/0073640 | A1 | 3/2016 | Curtis et al. | |
| 2017/0204147 | A1* | 7/2017 | Lorito | C07K 14/37 |
| 2018/0146683 | A1* | 5/2018 | Lorito | A01N 63/38 |
| 2019/0230937 | A1* | 8/2019 | Siepe | A01N 63/00 |

FOREIGN PATENT DOCUMENTS

| WO | WO9910477 A1 | 3/1999 |
|---|---|---|
| WO | 2010091337 A1 | 8/2010 |
| WO | 2013078365 A1 | 5/2013 |
| WO | WO2013134267 A1 | 9/2013 |
| WO | 2014036474 A1 | 3/2014 |
| WO | 2014085576 A1 | 6/2014 |
| WO | WO2014085576 A1 | 6/2014 |
| WO | WO2015011615 A1 | 1/2015 |
| WO | 2015126256 A1 | 8/2015 |
| WO | WO2015126256 A1 | 8/2015 |
| WO | 2016011562 A1 | 1/2016 |
| WO | 2016189329 A1 | 12/2016 |
| WO | 2017192117 A1 | 11/2017 |

OTHER PUBLICATIONS

RPD No. 942 "Gray-Mold Rot or Botrytis Blight of Vegetables" University of Illinois Extension. <http://ipm.illinois.edu/diseases/series900/rpd942/> May 2000 (Year: 2000).*

Prograin. "Everything you need to know about soybean populations" May 26, 2020 <https://prograin.ca/ca/en/2020/05/26/everything-you-need-to-know-about-soybean-populations/> (Year: 2020).*

Robinson et al. "Plant Populations and Seeding Rates for Soybeans". Soybean Production Systems. Purdue University. 2007 (Year: 2007).*

Wimmer, Thomas. "Cyclodextrins." Ullmann's Encyclopedia of Industrial Chemistry (2000). (Year: 2000).*

Written Opinion of the International Searching Authority for International Application No. PCT/US2018/025591; dated Jul. 19, 2018; 9 pages.

International Search Report (ISR) for International Application No. PCT/US2018/025591; dated Jul. 19, 2018; 3 pages.

Partial supplemental European Search Report regarding corresponding EP App. No. 18776440.2; dated Dec. 7, 2020.

Jalali, Farnaz, et al., "Volatile organic compounds of some Trichoderma spp. increase growth and induce salt tolerance in *Arabidopsis thaliana*," Fungal , Elsevier, Amsterdam, NL, vol. 29; pp. 67-75; Jul. 26, 2017.

Kergunteuil, Alan, et al., "Biological control beneath the feet: A review of crop protection against insect root herbivores," Insects, vol. 7, No. 4, pp. 1-2 and 7-10; Nov. 29, 2016.

Pertot, Ilaria, et al., "Perspectives and challenges of microbial application for crop improvement," EIP-AGRI Agricultural & Innovation funded by European Commission, pp. 1-11; Jan. 2015.

Timmusk, Salme, et al.; Perspectives and Challenges of Microbial Application for Crop Improvement; Frontiers in Plant Science, vol. 8, Article 49 dated Feb. 9, 2017 (10 pages).

Brazilian Office Action for BR Application No. 112019020481.4 dated May 24, 2022 (3 pages).

* cited by examiner

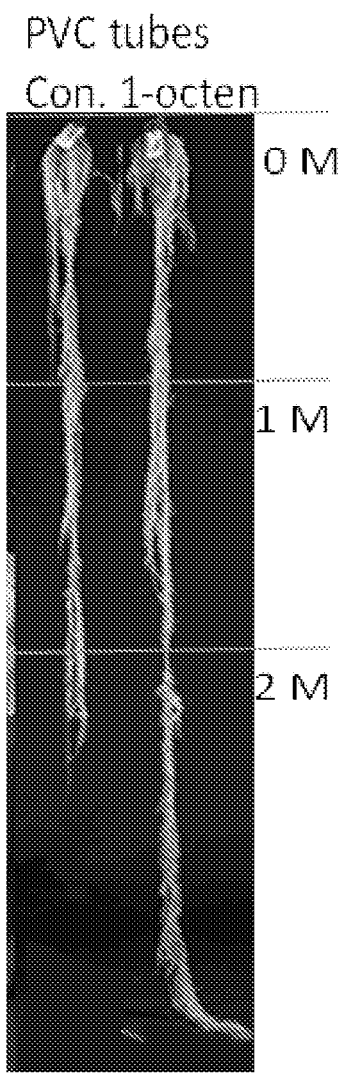 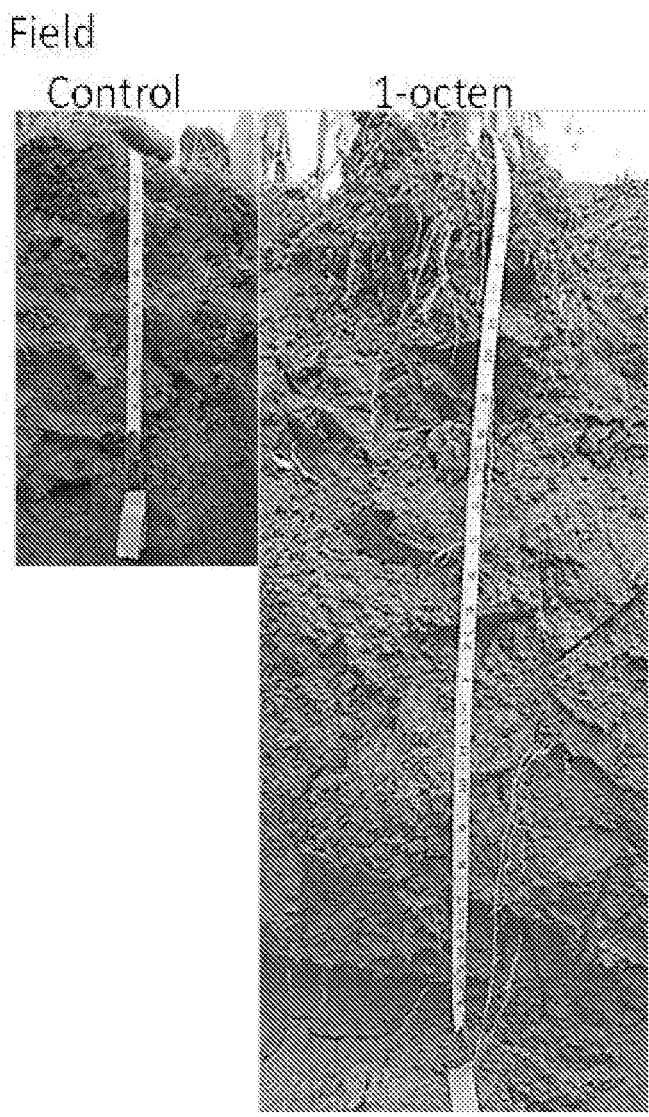
FIG. 1A                              FIG. 1B

COATING MATERIALS FOR SEEDS AND FOR PARTICULATE MATERIALS, INCLUDING FERTILIZERS

RELATED APPLICATIONS

This application is a National Stage of International Application No. PCT/US2018/025591 filed Mar. 30, 3018 which claims priority to. U.S. Provisional Patent Application Ser. No. 62/479,080 filed Mar. 30, 2017, U.S. Provisional Patent Application Ser. No. 62/479,084 filed Mar. 30, 2017, and U.S. Provisional Patent Application No. 62/479,074, filed Mar. 30, 2017. The entire disclosures of each of the above applications are incorporated herein by reference.

TECHNICAL FIELD

This disclosure relates to coating materials for seeds and particulate materials, including fertilizers, to enhance plant growth and productivity.

BACKGROUND ART

It is an ongoing concern in agriculture to provide enhanced root development in plants and the work reported here is a part of the effort to provide such development.

SUMMARY

The applicant is involved in research to provide products that improve plant performance, including SABREX and GRAPHEX. The former product is intended for use with corn (Strain K2 (*T. afroharzianum*)+Strain K4 (*T. atroviride*)), while the latter is an inoculant seed lubricant used with soybeans.

It is an ongoing concern in agriculture to provide enhanced root development and the work reported herein is a part of the effort to provide such development. These and other advantages are provided by the compositions and methods described in more detail below.

BRIEF DESCRIPTION OF THE DRAWINGS

FIGS. 1A and 1B are photographic illustrations of the comparative development of corn roots when treated with octenol.

DESCRIPTION OF THE PREFERRED EMBODIMENTS

Figures 2A, 2B:
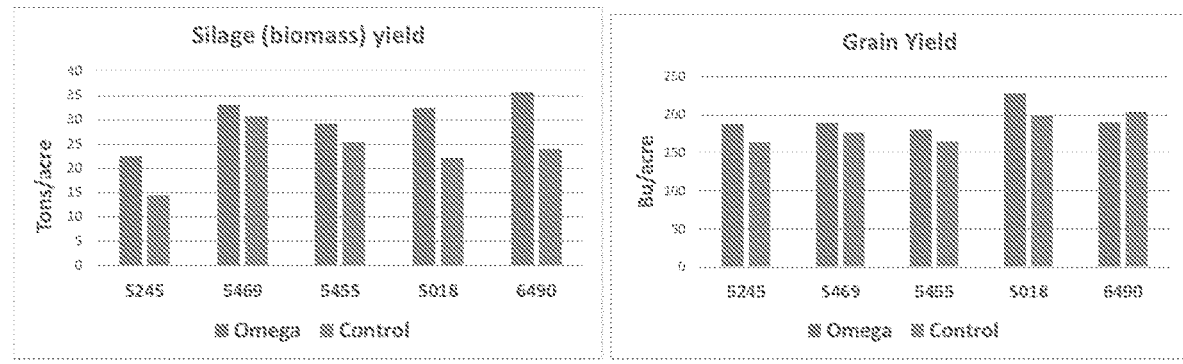
FIGS. 2A through 2D are bar graphs demonstrating the positive effects of octenol in silage biomass yield, grain yield, and disease resistance.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read together with the specification, and are to be considered a portion of the entire written description of this invention.

This present disclosure includes three components, all intended for the purpose of enhancing plant growth and performance: (1) the capabilities of 1-octen-3-ol, which is a metabolite of *Trichoderma* strains and formulations thereof, (2) a method for formulating this component or other highly effective compounds into stable formulations, and (3) other materials which are expected to be effective with both 1 and 2.

This disclosure claims recent discoveries of fundamental importance to agriculture and to society. The applicants have conducted basic and applied studies on the intricate interaction between beneficial endophytic root colonizing microbes and their hosts. A critical observation is that these organisms colonize only plant roots, but from this platform they induce system-wide changes in plant physiology. These system-wide changes occur as a consequence of triggering of plant responses including resistance to a wide variety of stresses, both biotic and abiotic, increased plant growth and yield and improved nutrient utilization.

Applicants have begun evaluating the triggering molecules released in the rhizosphere since applicants expected that they might have both commercial and basic scientific uses. The expectation was they would have beneficial effects upon plants; an expectation that has been validated by scientific literature. In the course of research, it was discovered that *T. afroharzianum* (formerly *T. harzianum*) produces 1-octen-3-ol (mushroom alcohol) and that at very low concentrations in aerial solution that it enhances plant growth and productivity, a result that could be duplicated by seed treatments at low concentrations.

Octenol (CAS No. 3391-86-1) is also referred to as 1-octen-3-ol, 1-vinyl hexanol, mushroom alcohol, and Omega. The compound is contained in human breath and sweat. It is known to attract biting insects, such as mosquitoes, so it has been used to attract insects to trap or exterminate them. It is approved by the FDA as a food additive, although it is of moderate toxicity, with an LD 50 of 340 mg/kg. Octenol has a chemical formula of $C_8H_{16}O$.

Applicants expected that this compound as well as other microbial metabolites would have transitory but beneficial effects on plant growth, resistance to stresses and other advantages. However, as the project developed and field trials were conducted on seed treatments with octanol in field and large-scale laboratory tests, the effects were discovered to be neither transitory nor small. If seeds were treated with formulations containing only 0.7 µl/seed, season long effects were observed.

These effects include an increase in corn yields, resistance to early-season flooding stress and very substantial effects upon corn root development and induced resistance to disease in the foliage, even though the metabolite was applied only to the seed (see, e.g. FIG. 1 and FIG. 2). In the roots produced in field soil in PVC pipes, adequate water was applied throughout the growing season. Conversely, in the field trial shown in FIG. 1, the plants were subject to severe drought, according to official weather service notices. In both cases, the growth of roots was much greater when produced from seeds treated with the chemical. Further, in the field, substantial long-term effects were observed with both corn and squash, which suggests wide-spread activity across very different crop species.

Clearly, this compound induces fundamental and long-term beneficial changes in plant physiology that can provide immediate benefit to farmers. It is anticipated that, based on analogy with the beneficial fungi that produce the metabolite, the substantial increase in plant root development and its observed abilities to substantially reduce effects of other stresses, that application early in the season can (a) increase plant productivity, and (b) reduce the effects on a plant caused by stresses such as drought.

However, even if highly successfully, a positive demonstration of the effects of this compound is of limited value. It can provide an immediate salable product but unless the process by which this effect is achieved can be described, i.e., how does this compound affect plant growth and productivity, any development and use of the compound in agriculture is a "one-off" with no utility for further development and discovery. Clearly, the effects are long-term, but the compound added at such a small concentration early in the season can be present only for a short time, particularly since it is a compound that likely will be rapidly metabolized.

The observed long-term effects must logically involve equally long-term effects upon plant gene function and/or soil microbiology. Indeed, plant disease resistance frequently involves chromatin changes so that plants are in a primed state that allow plant cells to respond to biotic and abiotic stresses with a faster and stronger activation of defensive systems. This has been linked to induction of a molecular memory programmed by epigenetic changes. This can be a long-term effect, and there are commercially available products that give some effect for plant disease resistance, but applicants know of none that are comparable to the effects provided by the disclosed components and methods, yielding the results as shown in FIGS. 1 and 2.

However, there are other possibilities for long-term effects. For example, gene regulation by microRNAs occurs in corn lines in the presence of salt stress and differ in lines that have different levels of resistance to the stress. Plants growing in the field, along with most organisms, are composed of the actual organism plus its entire microbiome. Understanding of the holobiont (the organism plus its microbial community) is essential to understanding affects the function and physiology of the host. Understanding the interactions and their effects are critical for predictive systems addressing challenges facing modern societies.

Turning to FIG. 1 in detail, pictured are the development of corn roots from seeds not treated (left) or treated with 0.7 µl of 1-octen-3-ol (right) at the time of corn maturity (that is, 3 months after application of octenol). In FIG. 1A, plants were grown in PVC tubes about 4 M long in natural field soil, and the treated seeds produced roots that exceeded the control by about 50%. Length of roots are indicated in meters (M) by the scale at right.

When grown in the field, that is, in a setting where maximum root length was not impeded by the experiment itself, a similar or better result obtained. In FIG. 1B, roots were exposed in field grown plants with a back hoe trench and photographed. The images were adjusted so that the root volume in each is proportionally sized. In the control shown the root was 30 cm long, and with the treatment the root was 78 cm long to deepest part of the root visible.

Turning to FIG. 2 in detail, pictured are long-term effects of 1-octen-3-ol (represented as the designation "Omega" on the chart) on yields of corn, yield increases in squash and control of powdery mildew on squash. Treatments in every case were seed treatments with about 0.7 µl of 1-octen-3-ol. Effects shown are 2-3 months post-planting, thus demonstrating the long-term effects of the chemical on plant performance.

FIGS. 2A and 2B show yields of corn in field trials, 2015. Plants grown from seeds treated as described above gave significantly higher yields of both biomass and grain than untreated ones even though a very small amount of the chemical was used to treat the seeds months before harvest.

Figures 2C, 2D:
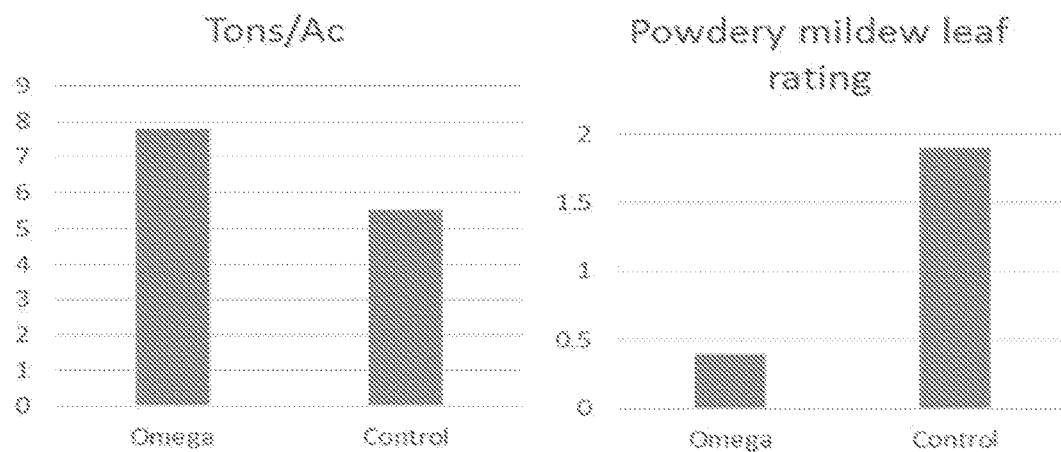
Figure 3A:
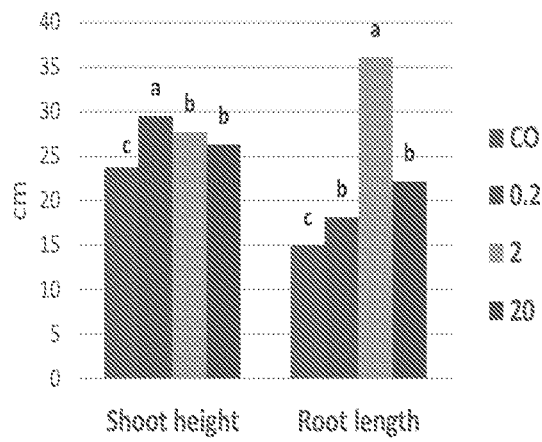
FIGS. 3A through 3D are bar graphs demonstrating the positive effects of octenol in corn and soybean seedlings.
Figure 3B:
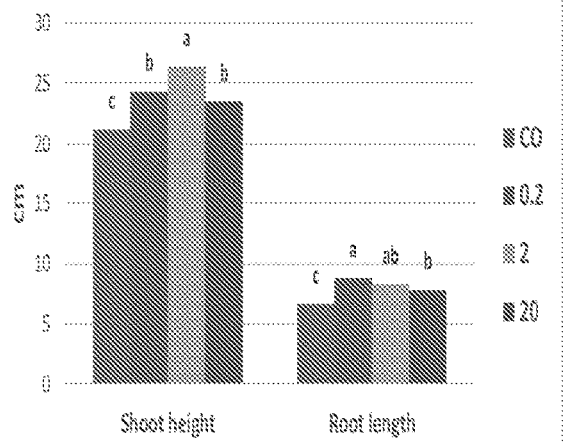
Figure 3C:
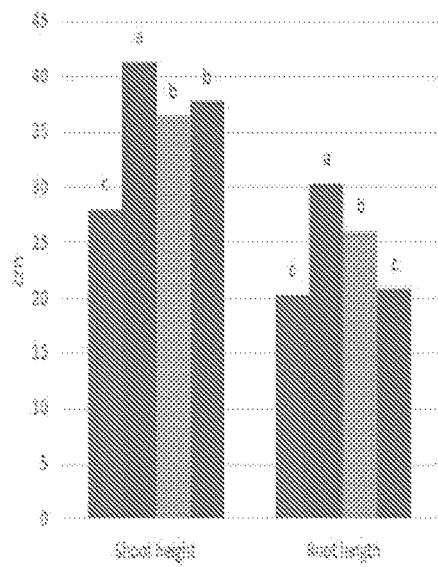
Figure 3D:
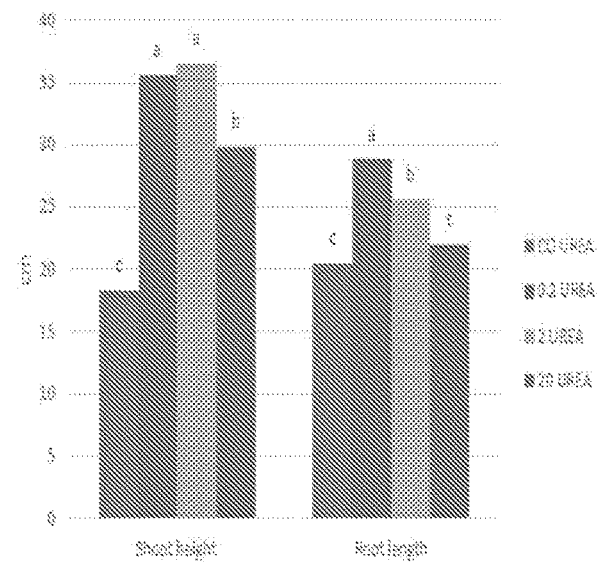

FIGS. 2C and 2D show yield differences and disease resistance, as indicated by occurrence of powdery mildew from natural infection in field-grown squash following the same seed treatment protocol as above. The differences shown are significant at P=0.01. The yields are weights of fruit/ac. The powdery mildew disease rating is 0=no disease, 1=1 lesion/leaf, 2=2 lesions/leaf and 3=3 lesions per leaf. Clearly, in this crop, both yield and disease resistance were systemically enhanced by the very small amount of active material applied to seeds at the time of planting.

Turning to FIG. 3, shown are corn (FIGS. 3A and 3B) and soybean (FIGS. 3C and 3D) seedling size following seed treatments at 0 (CO), 0.2, 2 and 20 µl/seed or of fertilizer with cyclodextrin/1-octen-3-ol at 0 (CO), 0.2, 2 and 20 µl/g of urea fertilizer. Plants were about 15 days old and bars with dissimilar letters denote statistical differences at P=0.01.

Figure 4:
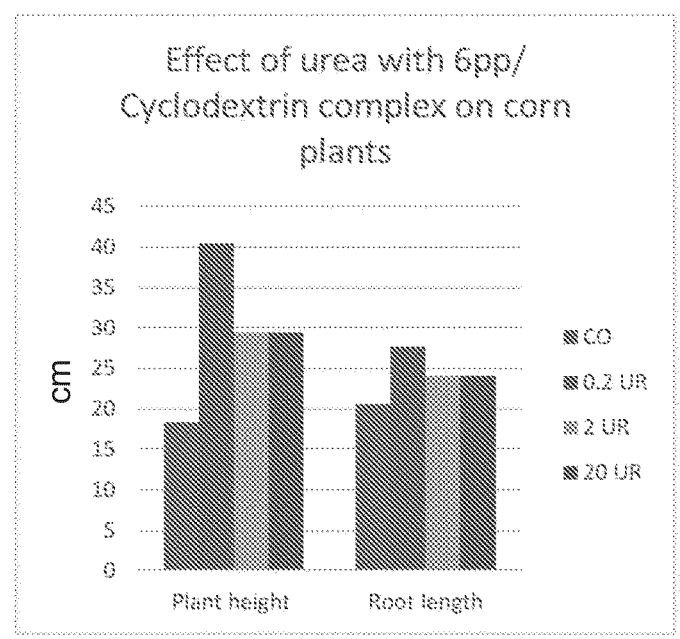
FIG. 4 is a bar graph demonstrating the positive effects of 6PP in corn seedlings.

FIG. 4 illustrates corn seedling size following seed treatments at 0 (CO), 0.2, 2 and 20 µl/seed or of fertilizer with cyclodextrin/6PP at 0 (CO), 0.2, 2 and 20 µl/g of urea fertilizer. Plants were about 15 days old and bars with dissimilar letters denote statistical differences at P=0.01.

Formulation Systems.

1-octen-3-ol is a volatile and apolar molecule. Results noted above were with a seed treatment is a very dilute aqueous suspension, but more stable formulations are necessary for commercial success. Any innovations must be packaged into formulations appropriate for agriculture. The active ingredient identified, however, is volatile, and so necessitates systems that (a) permit production of formulations that do not evolve the chemical in storage, but (b) release the chemical in soil when seeds are planted. What is required is a formulation that is stable when dry, but is activated by moisture. Ideally, the formulation would permit application of the innovation in a variety of types of products.

There is the potential to produce both seeds and fertilizers with treatments that confer resistance to drought or other benefits to corn and other crops. This cannot probably be done with microbial agents on fertilizers because microbes will be killed by the release of salts from the fertilizers when they are applied to soils. However, it is possible to produce augmented, highly active fertilizers containing 1-octen-3-ol or other recently discovered triggers of plant responses. Fertilizers ought to be highly attractive to growers; either seed treatments or fertilizers could potentially be purchased that would provide numerous benefits (see FIGS. 1 and 2).

As noted, 1-octen-3-ol is a volatile chemical. Therefore, for shelf life and to provide usefulness, the chemical needs to be stabilized. Fortunately, a technology has been developed, that of sequestration in a circular dextrin. Such systems have been deployed and discussed for other applications, for example for human therapy. Essential oils from plants and surfactants have been described in the literature. This development permits sequestration of apolar molecules. The molecules are released in the dry state only to a very limited extent but when moistened, for example when treated fertilizer granules or seeds are planted in soil, the chemical will be released. In effect, it provides a moisture-activated storage and sequestration system.

Novel cyclodextrin formulations have been produced and initial data are shown in FIG. 3. Larger seedlings with larger roots are evident with either the seed treatment delivery system or the augmented fertilizer. These data indicate that optimization, including the level of the chemical used, is essential. It is noted that formulations using components other than cyclodextrin are also contemplated by the present disclosure. For example, any compound having similar properties, such as being hydrophobic inside and hydrophilic outside, and that can form complexes with hydrophobic compounds, may be a suitable candidate for use in place of cyclodextrin as described herein.

Specific advantages of this formulation with 1-octen-3-ol are as follows:

The cyclodextrin formulation system permits sequestration of 1-octen-3-ol within the core of the cyclodextrin molecule. The chemical without the sequestration is volatile and odorous, which is objectionable. The cyclodextrin formulation complex reduces or almost eliminates the volatility of the chemical in the dry state. This is important as a critical handling aspect but also to retain the active ingredient within the formulation, thereby permitting long term storage without loss of the chemical due to volatilization.

This allows the formulation of a dry product that can be used to coat either seeds or fertilizers. The dry formulation can be suspended in aqueous or nonpolar solvents, e.g., oils, and applied to the surface of seeds or fertilizers.

When the seeds or fertilizers are applied to agricultural systems in moist soil, the chemical is released. With the fertilizer application, the volatile nature of 1-octen-3-ol is an advantage since the volatile chemical will be released into soil and come into contact with germinating seeds. Volatile chemicals are expected to be more mobile in the soil system than ones that are nonvolatile.

Other Applications of these Technologies.

The formulation systems can be applied to a variety of granular materials for use in plant agriculture or elsewhere. The examples above referred to granules of urea, but it can also be used to coat other types of granular fertilizers without limits.

In addition, it can be used to coat any type of granules that may be used for agricultural applications or elsewhere. The specific of the coating containing the cyclodextrin-encapsulated 1-octen-3-ol can vary but can be any type of aqueous suspension or emulsion. Such granules may be of different types and formulations that may or may not contain fertilizers.

The formulation systems designated here can be used with many other triggering compounds, signal molecules, or substances. In FIG. 4 is shown data on 6-pentyl pyrone (6PP) used with the same cyclodextrin formulation described above for use with 1-octen-3-ol. 6PP is effective in this use.

Compounds useful in this invention include but are not limited to the following:

From *Trichoderma:* 1-octen-3-ol, 6PP, Harzianic acid, Harzinalone, Hydrophobic proteins including Hydtral.

From *Bacillus*: Lipopeptides including surfactin, iturin, esperin, lichenysin, and pumilacidin.

From *Pseudomonas*, Thuricin.

The present disclosure contemplates that many changes and modifications may be made. Therefore, while the presently-preferred form of the system has been shown and described, and several modifications and alternatives discussed, persons skilled in this art will readily appreciate that various additional changes and modifications may be made without departing from the spirit of the invention, as defined and differentiated by the following claims.

What is claimed is:

1. A method for enhancing of plants consisting of the steps of:
    providing one or more microbial metabolites sequestered in a cyclodextrin complex;
    adding the one or more microbial metabolites sequestered in the cyclodextrin complex to a suspension medium selected from the group consisting of an aqueous suspension, an aqueous emulsion and a nonpolar solvent;
    applying the suspension medium with the one or more microbial metabolites sequestered in the cyclodextrin complex to a plant seed, wherein the application occurs at a level sufficient to increase a plurality of plant features selected from the group consisting of plant root development, plant growth, plant yield, resistance to drought, and plant disease resistance; and
    wherein the one or more microbial metabolites includes at least one of 1-octen-3-ol, 6-pentyl pyrone or a mixture thereof and is applied to the plant seed at a level of from 0.2 to 20 microliters of at least one of 1-octen-3-ol, 6-pentyl pyrone or a mixture thereof per plant seed, and wherein, optionally, the one or more microbial metabolites further comprises at least one microbial metabolite selected from the group consisting of harzianic acid, harzinalone, hydtra 1, surfactin, iturin, esperin, fengycin, lichenysin, pumilacidin, thuricin and mixtures thereof.

2. The method of claim 1, wherein the plant seed is selected from the group consisting of corn, squash and soybean.

3. The method of claim 1, wherein the one or more microbial metabolites comprises one or more of surfactin, iturin, esperin, fengycin, lichenysin, pumilacidin, thuricin and mixtures thereof.

4. The method of claim 1 wherein the plurality of plant features includes at least an increase in plant root development and an increase in plant disease resistance.

5. A method for enhancement of plants consisting of the steps of:
    providing one or more microbial metabolites sequestered in a cyclodextrin complex;
    adding the one or more microbial metabolites sequestered in a cyclodextrin complex to a suspension medium selected from the group consisting of an aqueous suspension, an aqueous emulsion and a nonpolar solvent;
    coating the suspension medium with the one or more microbial metabolites sequestered in the cyclodextrin complex onto an agricultural application granule to form a coated agricultural application granule;
    applying the coated agricultural application granule to one or more locations in, on, around, proximal to or by a plant, a plant seed, a plant crop, or a plant root, wherein the application occurs at the location at a level sufficient to increase a plurality of plant features selected from the group consisting of plant root development, plant growth, plant yield, resistance to drought, and plant disease resistance; and
    wherein the one or more microbial metabolites includes at least one of 1-octen-3-ol, 6-pentyl pyrone or a mixture thereof and is coated onto the agricultural application granule at a level of from 0.2 to 20 microliters of at least one of 1-octen-3-ol, 6-pentyl pyrone or a mixture thereof per gram of agricultural application granule, and wherein, optionally, the one or more microbial metabolites further comprises at least one microbial metabolite selected from the group consisting of harzianic acid, harzinalone, hydtra 1, surfactin, iturin, esperin, fengycin, lichenysin, pumilacidin, thuricin and mixtures thereof.

6. The method of claim 5, wherein the agricultural application granule coated is a plant fertilizer.

7. The method of claim 5, wherein the plant is selected from the group consisting of corn, squash and soybean.

8. The method of claim 5, wherein the one or more microbial metabolites further comprises one or more of surfactin, iturin, esperin, fengycin, lichenysin, pumilacidin, thuricin and mixtures thereof.

9. The method of claim 5 wherein the plurality of plant features includes at least an increase in plant root development and an increase in plant disease resistance.

* * * * *